United States Patent [19]
Wippern

[11] Patent Number: 4,479,316
[45] Date of Patent: Oct. 30, 1984

[54] LABEL STRIP

[75] Inventor: Gerhard Wippern, Hirschhorn, Fed. Rep. of Germany

[73] Assignee: Esselte Pendaflex Corporation, Garden City, N.Y.

[21] Appl. No.: 231,339

[22] Filed: Feb. 4, 1981

[30] Foreign Application Priority Data

Feb. 15, 1980 [DE] Fed. Rep. of Germany ....... 3005625

[51] Int. Cl.[3] ............................ B32B 3/16; G09F 3/08
[52] U.S. Cl. ...................................... 40/2 R; 156/289; 156/344; 428/42; 428/43; 428/131
[58] Field of Search ........................ 428/40, 41, 42, 43, 428/131; 40/2 R; 226/68; 156/289, 344

[56] References Cited

U.S. PATENT DOCUMENTS

| | | | |
|---|---|---|---|
| 1,678,675 | 7/1928 | Laencher | 40/2 R |
| 2,095,437 | 10/1937 | Fox | 428/195 X |
| 2,268,405 | 12/1941 | Kohnle | 226/68 |
| 2,896,351 | 7/1959 | Johnson | 428/40 X |
| 3,265,553 | 8/1966 | Kind et al. | 156/277 X |
| 3,312,005 | 4/1967 | McElroy | 428/42 |
| 3,330,207 | 7/1967 | de Man | 101/90 X |
| 3,420,364 | 1/1969 | Kennedy, Jr. | 40/2 R X |
| 3,503,834 | 3/1970 | Schroter | 428/42 |
| 3,852,140 | 12/1974 | Jenkins | 156/253 |
| 4,307,526 | 12/1981 | Wippern | 40/2 R |

*Primary Examiner*—Henry F. Epstein
*Attorney, Agent, or Firm*—Gerald J. Ferguson, Jr.; Joseph J. Baker

[57] ABSTRACT

A label strip including a carrier strip and labels adhering in series to the carrier strip by means of an adhesive layer. The label strip is for use in label printing or dispensing apparatuses, in which the carrier strip is drawn by a pull-off device progressively around a deflection device where the labels are released from the carrier strip. The labels are made from a material stiffer than paper. The side of the labels facing the carrier strip is adhesive-repellent while the side of the carrier strip facing the labels has an adhesive-retaining surface. Moreover, the adhesive layer is applied as at least one narrow band to the carrier strip so that the areas of the side of the carrier strip which come into contact with the pull-off device are adhesive-free.

10 Claims, 4 Drawing Figures

LABEL STRIP

Figure 1:
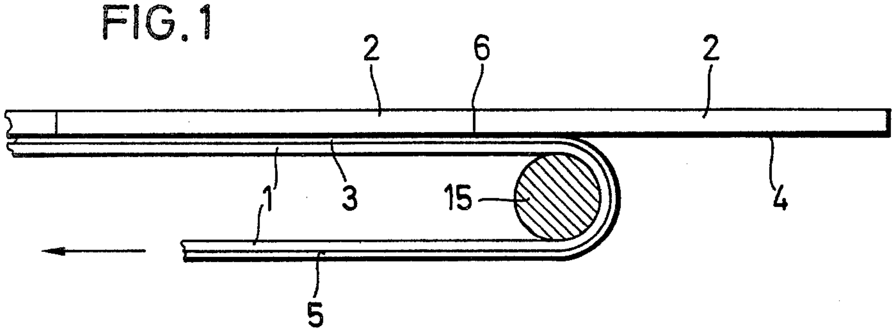

The invention refers to a label strip comprising a carrier strip and labels adhering in series to this carrier strip by means of an adhesive layer for processing in label printing and respectively or label dispensing apparatuses in which the carrier strip is drawn progressively around a deflection device on which the labels are released from the carrier strip.

Label strips of this type are, for example, known from U.S. Pat. Nos. 2,095,437, 3,503,834 and 3,852,140. Labelling apparatuses, which are intended for the processing of these labels are, for example, known from the U.S. Pat. Nos. 3,265,553 and 3,330,207.

The known label strips have the disadvantage that the labels adhering to the carrier strip are only usable as self-adhesive labels, not however as labels, which are, for example to be fixed to an article by means of a clip, string or any other tie-on device.

Label strips, which are made up of a series of cardboard labels, which are to be fixed to an article by means of clips or string are known from the U.S. Pat. Nos. 1,678, 675 and 2,268,405. These known label strips have the disadvantage that they cannot be processed in label printing devices and in label dispensing apparatuses, whereby the label feed is effected by progressive pulling off of a carrier strip.

The task of the present invention is to create a label strip which enables the printing and dispensing of tie-on labels or labels fixed by means of clips with the aid of labelling apparatuses, which until now were only intended for the printing and dispensing of self-adhesive labels.

This problem is solved according to the invention in that the labels are made of a material stiffer than paper and that the side of the labels facing the carrier strip is treated adhesive-repellent, in particular is siliconized, and the side of the carrier strip facing the labels has an adhesive-retaining surface.

Because the labels are released from the carrier strip adhesive-free, they can—after they have been printed in the labelling apparatus—be used as tie-on labels.

Cardboard labels of the label strip according to the invention can be fed just as the self-adhesive labels of the known label strips by progessive pulling off of the carrier strip from the label feed roll to the printing device of the labelling apparatus and from there to the dispensing position. At the dispensing position the printed labels can be removed from the apparatus and attached to an article by means of clips, string or any other fixing means.

Appropriately the labels consist of a relatively light cardboard having a weight of 100 to 150 g/m$^2$, preferably 110 to 120 g/m$^2$. The labels can, however, also be cut out of a plastic film as stiff as cardboard.

The labels adhering to the carrier strip can be completely separated from one another by separation cuts or can be connected with one another via narrow, easily separable cross-pieces, which are located between short separation cuts. This latter mentioned embodiment has the advantage that several labels bearing for example the same price marking can be removed from the apparatus as a continuous unit.

Each label can be fitted with a tag eyelet in the area outside the field of inscription, so that these labels can be attached to articles of textile clothing or woven goods by means of a threadlike tie and with the help of an apparatus e.g. according to the U.S. Pat. No. 3,103,666.

Further features of the invention can be seen in the patent claims.

Figure 2:
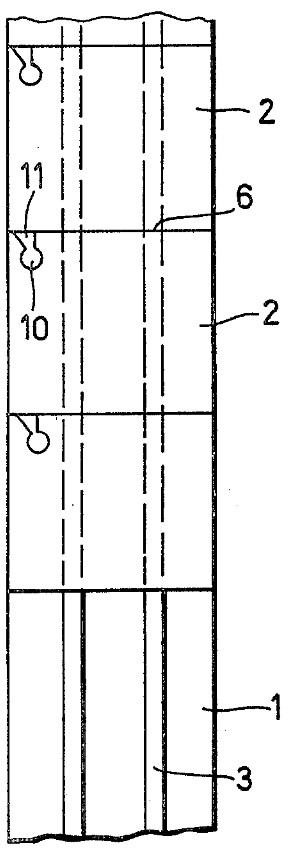
Figure 3:
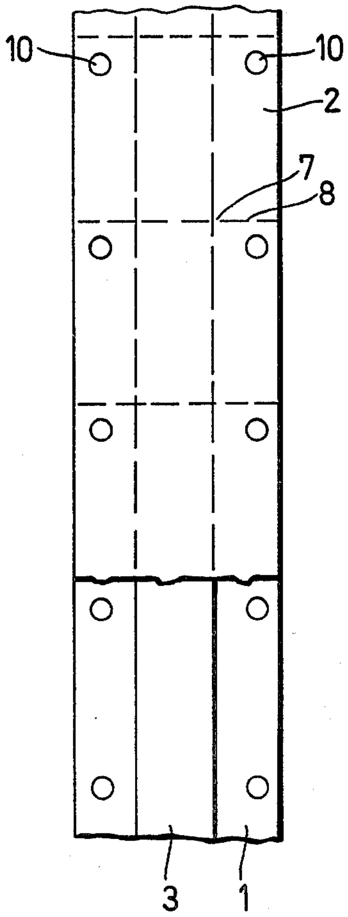
Figure 4:
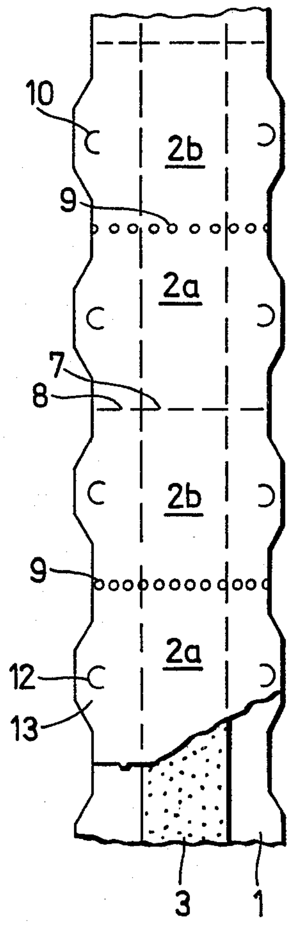

In the following description embodiment examples of the invention are more closely explained with reference to the drawing. The drawing shows in:

FIG. 1 a side view of the label strip according to the invention with carrier strip guided aroud a deflection device;

FIGS. 2,3 and 4 top view of three embodiment examples of label strips according to the invention.

As is to be seen from FIG. 1 the label strip comprises a carrier strip 1 and labels adhering in series to this carrier strip 1 by means of an adhesive layer 3. These label strips are processed in label printing and dispensing apparatuses in which the carrier strip 1 in progressively drawn around a deflection device 15. The pull-off steps always correspond to the spacing of the labels from one another, with the result that after each progressive pulling-off one label arrives in a printing position and another label in a dispensing position.

In the case of the label strip according to the invention the labels 2 are made of a material stiffer than paper and the side 4 of the labels 2 facing the carrier strip 1 is treated adhesive-repellent, whereas the side 5 of the carrier strip 1 facing the labels 2 has an adhesive-retaining surface. In the area of the deflection device 15 the label 2 is released from the carrier strip 1, whereby the adhesive-retaining side 5 of the carrier strip 1 takes with it the adhesive layer 3 and releases the label 2 adhesive-free.

As FIGS. 2,3 and 4 show, the adhesive layer can be applied to the carrier strip 1 in the form of two narrow strips or one central strip. The areas of the side 5 of the carrier strip 1, which come into contact with the pull-off device of a labelling apparatus, should in each case be adhesive-free.

As FIG. 2 shows, the labels 2 can be separated completely from one another by smooth, continuous separation cuts 6.

In order to be able to dispense several labels provided with identical imprints for example as a unit, it is advantageous if the labels 2 are only separated from each other by short separation cuts 7, whereby cross-pieces 8 remain between the short separation cuts 7, via which the individual labels 2 are connected to one another is an easily separable manner.

In the case of the embodiment example according to FIG. 4 each two successive labels 2*a*, 2*b* form a double label. Between the individual labels 2*a*, 2*b* of a double label a tearable perforation line 9 is punched. In the case of this label strip the double labels are separated from each other respectively by a continuous separation cut or however, as FIG. 4 shows, by short separation cuts 7, so that even the double labels 2*a*, 2*b* are connected to each other via easily tearable cross-pieces 8. The cross-pieces 8 can, however, be torn across with considerably more ease than the connecting cross-pieces of the perforation line 9.

In the case of the label strip according to FIG. 2 an attaching eyelet 10 is punched respectively into the top left hand corner of one label, which is open via a feed hopper 11. Such cardboard labels fitted with an open tag eyelet are used for example for price marking of shirts and are pushed under a button with the feed hopper 11 so that the label 2 is held by the fixing of the button.

In the case of the embodiment example according to FIG. 3 holes 10 are punched into both upper corners of the labels 2, which can be used as fixing eyelets. The holes 10 are also punched in the carrier strip 1 with the result that these can be used at the same time even for the control of an exact recorded strip removal.

In the case of the embodiment example according to FIG. 4 the tag eyelets 10 are formed by U-shaped notches 12 which enclose tongues, which can be pressed out of the surface of the labels.

In the case of the label strip according to FIG. 4 the lateral margins of the label strip are undulating, the labels having bulges 13 respectively in the middle of their lateral margins. Appropriately the tag eyelets 10 are arranged in the area of these bulges 13.

Inasmuch as the labels 1, as FIG. 3 shows, are connected with each other via narrow cross-pieces 8, the force with which the labels 2 adhere to the carrier strip 1 can be relatively slight. The non-setting moist respectively still sticky adhesive agent can be applied in thin layers or even in blobs to the carrier strip 1.

In order that side 4, facing the carrier strip 1, of the labels 2 made of stiff paper or light cardboard is adhesive-repellent, it must be specially treated, for example siliconized or glued and smoothened in such a way that the glueing respectively the adhesive layer 3 is easily released from the labels 2. In FIG. 1 the thicknesses of the carrier strip 1, the labels 2 and the adhesive layer 3 are markedly increased. The thickness of the carrier strip 1 can be approximately 0.1 mm, the thickness of the labels approximately 0.2 to 0.3 mm and the thickness of the adhesive layer approximately 0.01 mm.

I claim:

1. Label strip comprising a carrier strip and labels adhering in a series to said carrier strip by means of an adhesive layer for processing in label printing or dispensing apparatuses, in which the carrier strip is drawn by a pull-off device progressively around a deflection device where the labels are released from the carrier strip, characterized in that the labels (2) are made from a material selected from the group consisting of a cardboard having a weight of 100 to 150 $g/m^2$ and a plastic film as stiff as cardboard and that the side (4) of the labels (2) facing the carrier strip (1) is adhesive-repellent and the side (5) of the carrier strip (1) facing the labels (2) has an adhesive-retaining surface, the adhesive repellent side of the labels facing the carrier strip being (a) siliconized or (b) smoothed so that the adhesive-retaining surface of the carrier strip is released from the labels (2) as the carrier strip is drawn around the pull-off device.

2. Label strip according to claim 1 where the labels are substantially thicker than the carrier strip.

3. Label strip according to claim 1 where the weight of said cardboard is 110 to 120 $g/m^2$.

4. Label strip according to claim 1, characterized in that the labels (2) are connected with one another via narrow, easily separable cross-pieces (8) which remain between short separation cuts (7).

5. Label strip according to claim 1, characterized in that each two consecutive labels (*2a*, *2b*) form a double label and between them a tearable perforation line (9) is punched.

6. Label strip according to claim 1, characterized in that a tag eyelet (10) is perforated into each label (2).

7. Label strip according to claim 6, characterized in that said tag eyelet (10) is formed by a U-shaped notch (12) encircling a press outable tongue.

8. Label strip according to claims 6 or 7, characterized in that said tag eyelet (10) is arranged in the area of one corner of the label (2).

9. Label strip according to claim 7, characterized in that the side margins of the labels (*2a*, *2b*) are bulged in the middle in the known manner and the tag eyelets (10) are arranged in these bulging areas (13).

10. Label strip according to claim 1, characterized in that the adhesive layer (3) is applied in the form of at least one narrow strip to the side (5) of the carrier strip (1) such that the areas of said side (5) which come into contact with the pull-of device are adhesive-free.

* * * * *